(12) United States Patent
Riibe

(10) Patent No.: US 9,085,208 B1
(45) Date of Patent: Jul. 21, 2015

(54) MEANS FOR ELECTRICALLY CONNECTING A VEHICLE ELECTRICAL SYSTEM TO A TRAILER

(71) Applicant: Gary Riibe, Herman, NE (US)

(72) Inventor: Gary Riibe, Herman, NE (US)

( * ) Notice: Subject to any disclaimer, the term of this patent is extended or adjusted under 35 U.S.C. 154(b) by 0 days.

(21) Appl. No.: 14/537,152

(22) Filed: Nov. 10, 2014

(51) Int. Cl.
*B60D 1/62* (2006.01)
*B60D 1/01* (2006.01)
*B62D 53/12* (2006.01)

(52) U.S. Cl.
CPC ........ *B60D 1/62* (2013.01); *B60D 1/015* (2013.01); *B62D 53/125* (2013.01)

(58) Field of Classification Search
CPC ............ B60D 1/62; B60D 1/64; B60D 53/08; B60D 53/125
See application file for complete search history.

(56) References Cited

U.S. PATENT DOCUMENTS

| | | | | |
|---|---|---|---|---|
| 1,805,642 A * | 5/1931 | Strachan | | 280/422 |
| 1,931,752 A * | 10/1933 | Connors | | 280/422 |
| 3,181,887 A * | 5/1965 | Boylan et al. | | 280/421 |
| 3,797,862 A * | 3/1974 | Letterman | | 280/422 |
| 5,060,964 A * | 10/1991 | Vick | | 280/421 |
| 5,909,891 A * | 6/1999 | Swart et al. | | 280/422 |
| 8,038,181 B2 | 10/2011 | Marschall et al. | | |
| 8,465,041 B2 | 6/2013 | Riibe | | |
| 2006/0255559 A1* | 11/2006 | Abate et al. | | 280/422 |
| 2007/0176394 A1* | 8/2007 | Gehring et al. | | 280/420 |
| 2008/0036175 A1* | 2/2008 | Alguera | | 280/420 |
| 2011/0092080 A1* | 4/2011 | Alguera et al. | | 439/35 |
| 2013/0193669 A1* | 8/2013 | Glazner | | 280/421 |

* cited by examiner

*Primary Examiner* — Joseph Rocca
*Assistant Examiner* — Marc A Scharich
(74) *Attorney, Agent, or Firm* — Dennis L. Thomte; Thomte Patent Law Office LLC

(57) ABSTRACT

A device for electrically connecting a vehicle electrical system to the electrical system of a trailer is disclosed which automatically connects the same when the kingpin of the trailer is secured to the fifth wheel hitch of the vehicle.

4 Claims, 10 Drawing Sheets

MEANS FOR ELECTRICALLY CONNECTING A VEHICLE ELECTRICAL SYSTEM TO A TRAILER

BACKGROUND OF THE INVENTION

1. Field of the Invention

This invention relates to a means for electrically connecting a vehicle electrical system to a trailer and more particularly to a means for electrically connecting a vehicle electrical system to a trailer by means of the hitch connection therebetween.

2. Description of the Related Art

Trailers normally have a lighting system provided thereon for rear lights, turn signal lights and brake lights. Normally, the lights of the trailer are connected to the electrical system of the towing vehicle by means of electrical leads of the trailer being connected to electrical leads of the vehicle's electrical system. Frequently, the driver of the vehicle forgets to disconnect the leads between the trailer and vehicle electrical system and pulls the same apart as the trailer is being disconnected from the vehicle hitch. Further, sometimes the electrical leads of the trailer lights become inadvertently disconnected from the electrical leads of the vehicle electrical system.

In U.S. Pat. No. 8,038,181 a means is disclosed for electrically connecting a truck electrical system to a trailer electrical system by way of the fifth wheel hitch structure thereof. The instant invention represents an improved way of electrically connecting the truck electrical system to the trailer electrical system by way of the fifth wheel hitch structure.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A means is disclosed for electrically connecting a vehicle electrical system to a trailer electrical system. The trailer has a forward end and a rearward end. The trailer has a generally horizontally disposed slider plate having a forward end, a rearward end an upper surface and a lower surface, mounted on the trailer at the forward end thereof. A ring-shaped electrical contactor is positioned on the lower surface of the slider plate of the trailer. The electrical contactor is electrically connected to the trailer electrical system. A kingpin extends downwardly from the slider plate of the electrical contactor.

The towing vehicle has a forward end and a rearward end with the vehicle having an electrical system. The vehicle has a fifth wheel hitch mounted at the rearward end thereof. The fifth wheel hitch includes a slider plate having a forward end, a rearward end, an upper surface and a lower surface. The slider plate of the fifth wheel hitch has a kingpin receiving opening formed therein with forward and rearward ends. The fifth wheel hitch includes a kingpin locking structure which is positioned below the forward end of the kingpin receiving opening which is configured to lock the kingpin in the kingpin receiving opening.

The fifth wheel hitch includes an elongated electrical contact cartridge positioned at the forward end of the slider plate of the fifth wheel hitch. The electrical contact cartridge has an upper end. The electrical contact cartridge has a plurality of spaced-apart electrical contacts positioned therein which have upper ends positioned above the upper end of the electrical contact cartridge. The electrical contacts of the electrical contact cartridge are electrically connected to the electrical system of the vehicle. The electrical contactor is electrically connected to the electrical contacts of the electrical contact cartridge when the kingpin is locked into the kingpin receiving opening whereby the trailer electrical system is electrically connected to the vehicle electrical system.

In the preferred embodiment, the electrical contact cartridge is vertically movably mounted at the forward end of the slider plate of the fifth wheel hitch and is urged into an open position by a pair of springs. The electrical contact cartridge is electrically vertically movable by means of a cable which extends to a slidable handle on the fifth wheel structure.

It is therefore a principal object of the invention to provide an improved means for electrically connecting a vehicle electrical system to a trailer electrical system.

It is also a principal object of the invention to provide an improved means for transferring electrical power from a vehicle electrical system to the electrical system of a trailer.

A further object of the invention is to provide a means of the type described which is ideally suited for use with fifth wheel hitch structures.

A further object of the invention is to provide an improved means of the type described which does not require extensive modification of the trailer or vehicle.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
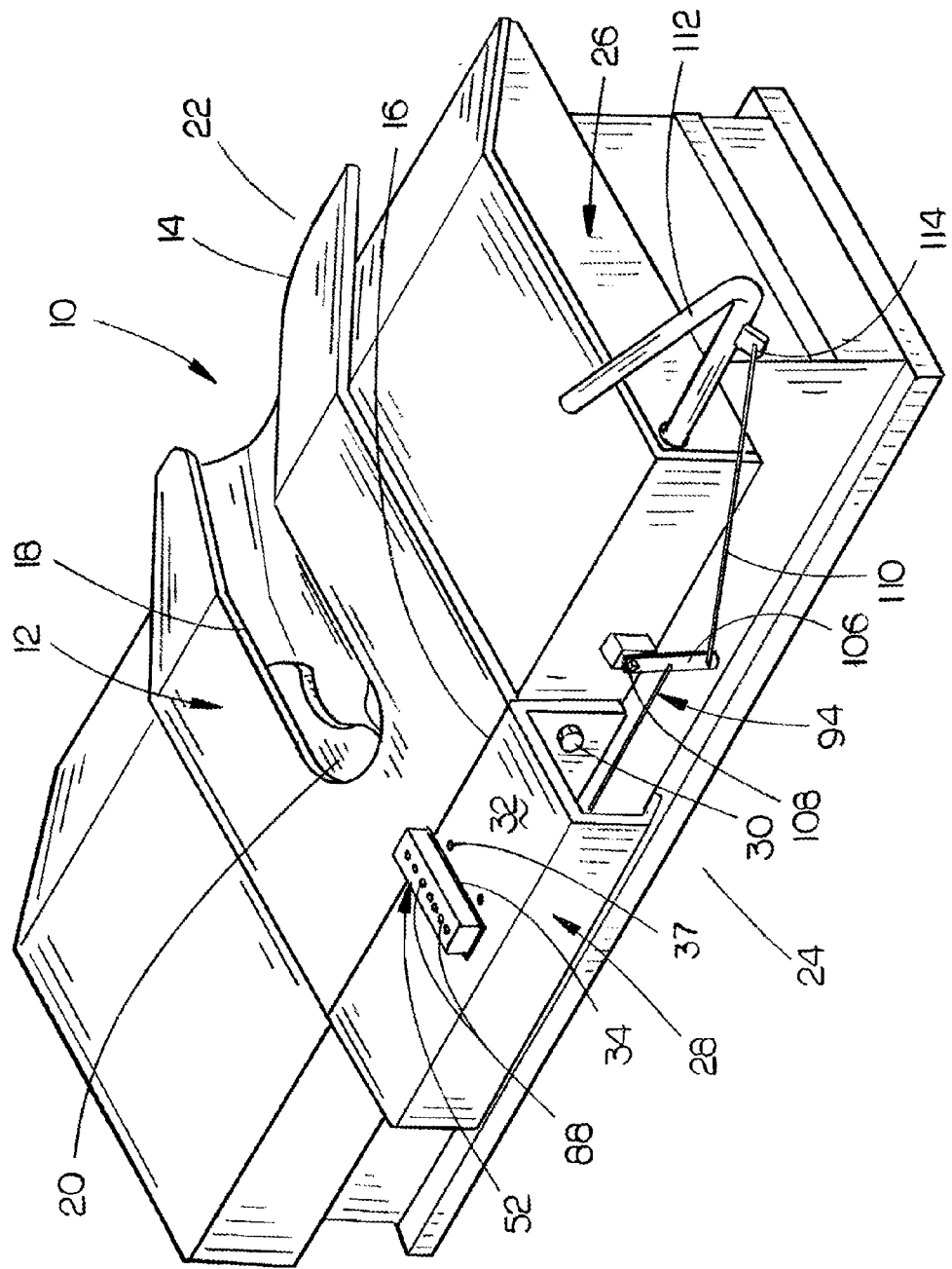
FIG. 1 is a front perspective view of the fifth wheel mounting structure which is mounted on a pickup, truck, etc.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a fifth wheel structure which is mounted in the bed of a truck 11 which is designed to have a trailer secured thereto. Structure 10 includes a generally horizontally disposed plate 12 which may have an inclined rearward end 14 and a forward end 16. Plate 12 has a U-shaped opening or seat 18 formed therein with a kingpin locking structure 20 being positioned below the plate 12 in conventional fashion. For purposes of description, structure 10 will be described as having a rearward end 22 and a forward end 24. Structure 10 includes a mounting housing 26 upon which the plate 12 is mounted. To this point, the structure 10 is conventional.

An inverted channel member 28 is secured to housing 26 by bolts 30 and has a top wall 32. Top wall 32 has a rectangular opening 34 formed therein. A vertically disposed rectangular support 36 comprised of an electrically insulated material is positioned below opening 34 and is secured to top wall 32 by screws 37. Support 36 includes walls 38, 40, 42 and 44. A plate 46 closes a portion of the lower open end of support 36 and is secured thereto by screws 48. Plate 46 has a slot or opening 50 formed therein.

Figure 5:
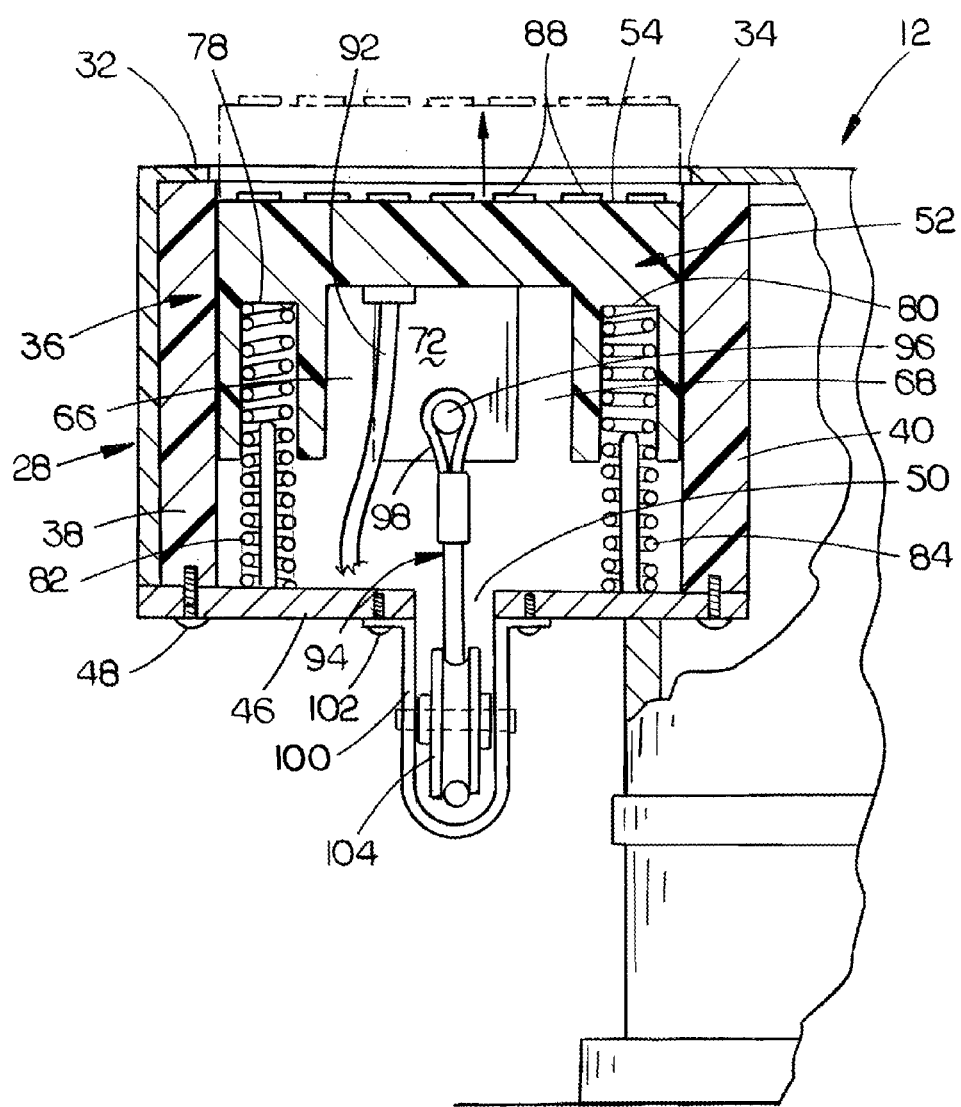
FIG. 5 is a partial sectional view which illustrates the electrical contact cartridge in its lowered position.

The numeral 52 refers to an electrically insulative cartridge or block member which is generally vertically movably mounted in opening 34 and support 36. The cartridge 52 is vertically slidably received by support 36 and is movable between upper and lower positions. Cartridge 52 includes an upper end 54, side walls 56 and 58, end walls 60 and 62, and a lower end 64. The lower end 64 of cartridge 52 has a pair of notches or cut-outs 66 and 68 formed therein which define a pair of spaced-apart ears 70 and 72 having openings 74 and 76 formed therein respectively. A pair of spaced-apart openings 78 and 80 extend upwardly into cartridge 52 from the lower end thereof which are configured to receive the upper ends of springs 82 and 84 therein respectively. The lower ends of springs 82 and 84 engage the upper surface of plate 46, as seen in FIG. 5.

Figure 6:
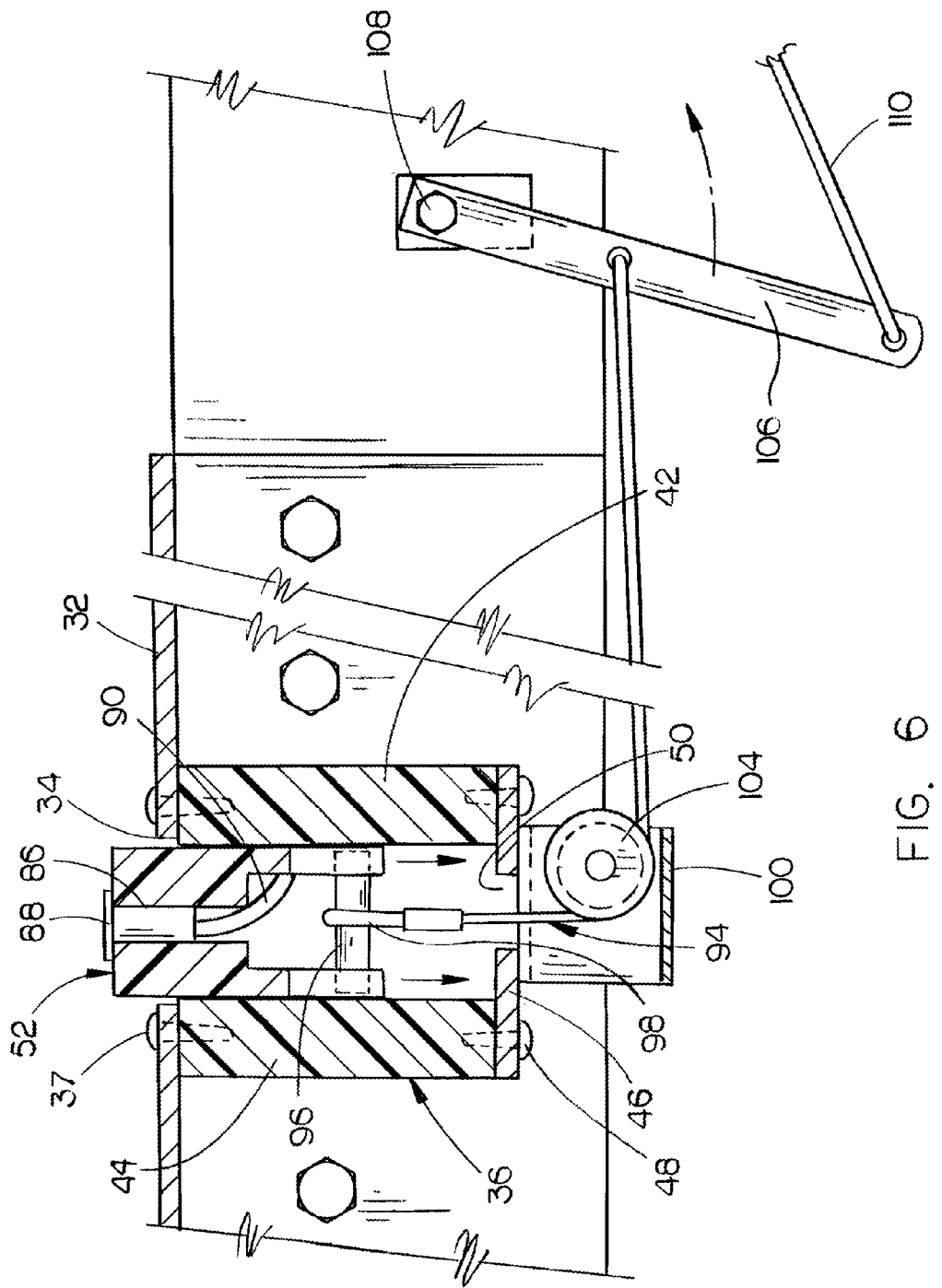
FIG. 6 is a partial sectional view illustrating the electrical contact cartridge in its upper position.

A plurality of spaced-apart openings or bores 86 extend downwardly into the upper end 54 of cartridge 52. An electrical contact member 88 is positioned in each of the openings 86 so that the upper ends thereof protrude upwardly from upper end 54 of cartridge 52. An electrical lead 90 extends from each of the contact members 88 with the leads 90 being enclosed in a flexible conduit or insulated tube 92 which extends from the cartridge 52. The upper end of cable 94 is positioned between the ears 70 and 72 and is secured thereto by a pin 96 which is positioned in openings 74 and 76 of ears 70 and 72 and which extends through the loop 98 of cable 94. Cable 94 extends downwardly from the pin 96 and through the slot 50 in plate 46 as seen in FIG. 6.

The numeral 100 refers to a sheave support which is secured to the lower side of plate 46 by screws 102. A sheave or pulley 104 is rotatably mounted in support 100 as seen in FIGS. 5 and 6. Cable 94 extends around sheave 104 as seen in FIG. 6 and extends generally horizontally therefrom. The end of cable 94 is connected to a pivotal arm 106, the upper end of which is pivotally secured to housing 26 at 108. As seen in FIGS. 1 and 5, cable 94 is secured to arm 106 between the upper and lower ends thereof. One end of cable 110 is connected to the lower end of arm 106 and extends therefrom.

Figure 2:
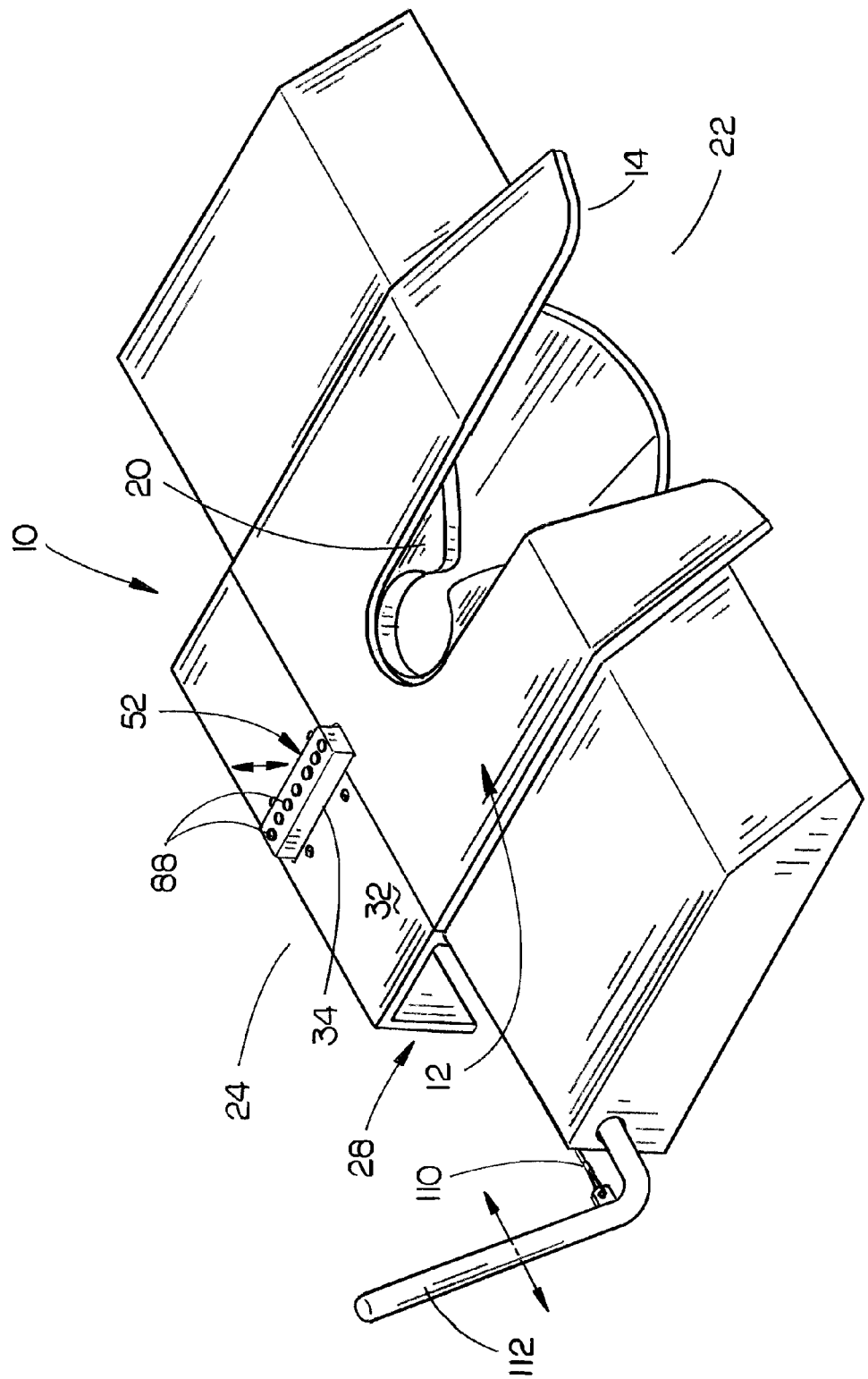
FIG. 2 is a rear perspective view of the structure of FIG. 1.
Figure 4:
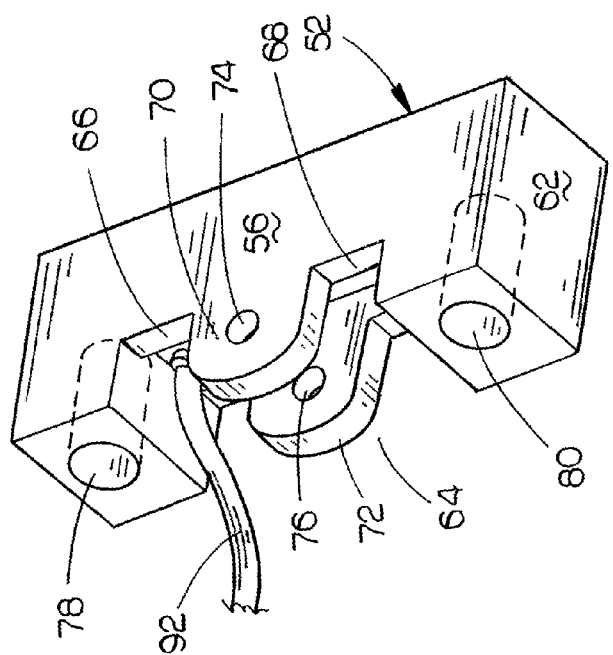
FIG. 4 is another perspective view of the electrical contact cartridge of this invention.
Figure 3:
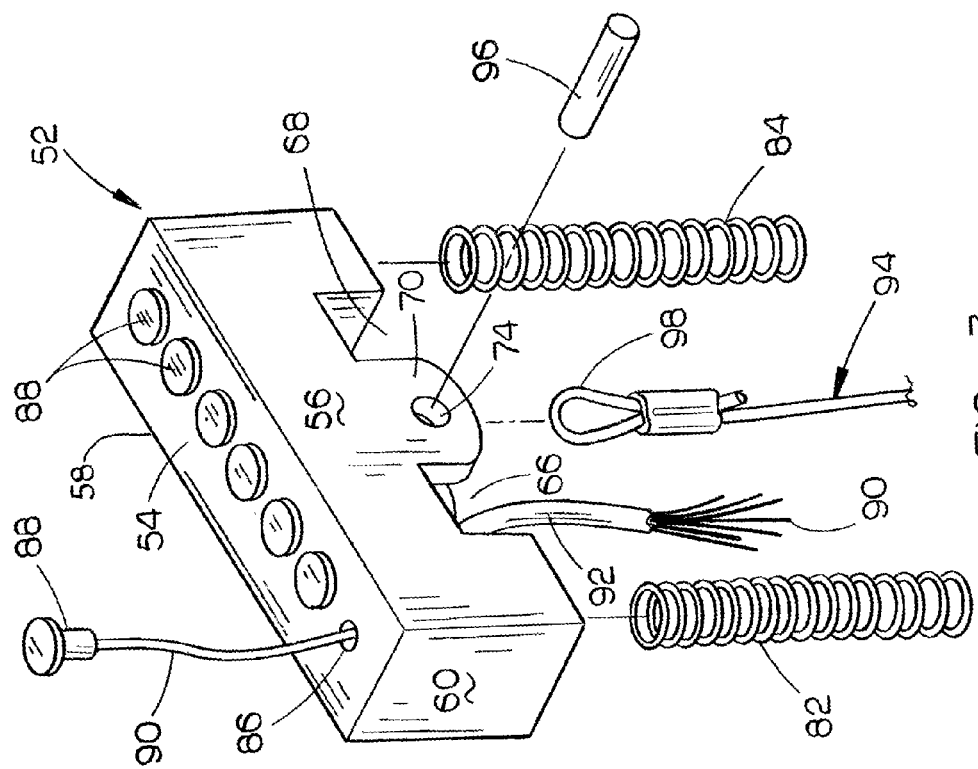
FIG. 3 is an exploded perspective view of the electrical contact cartridge of this invention.

The other end of cable 110 is secured to a handle 112 at 114. Handle 112 is horizontally slidably mounted in housing 26 as seen in FIG. 2.

The numeral 116 refers to a kingpin support which is provided at the forward end of the trailer. Kingpin support 116 includes a plate 118, sometimes referred to as a slider plate, which is secured to the lower forward end of the support 116 in conventional fashion and has four screw openings 120 formed therein. Plate 118 has a central opening 122 formed therein through which extends a conventional kingpin 124 which is slidably received by housing 26 and locked therein by the kingpin locking structure 20 in conventional fashion.

Figure 7:
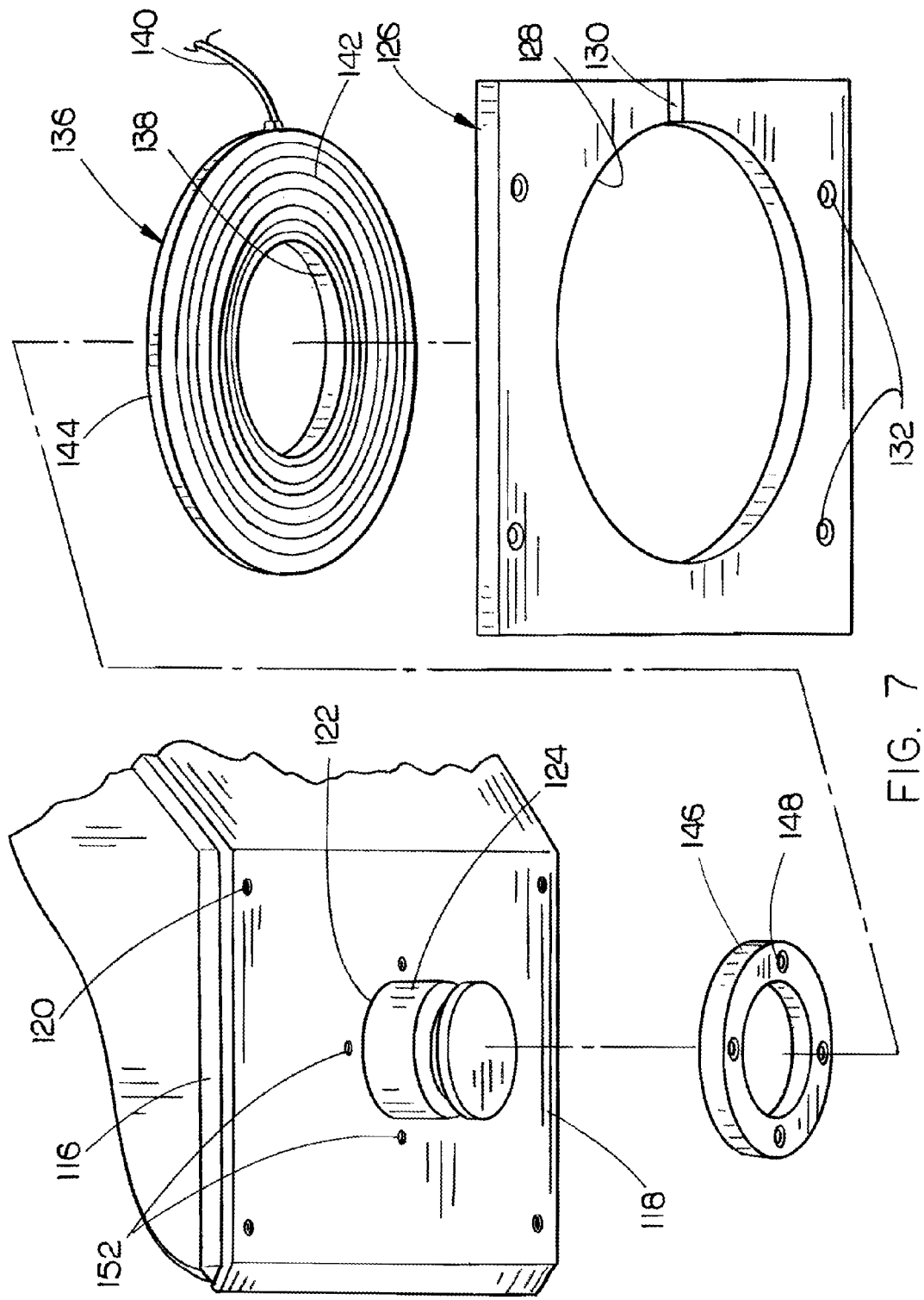
FIG. 7 is an exploded perspective view of the electrical contact structure which is positioned at the forward end of the trailer.
Figure 8:
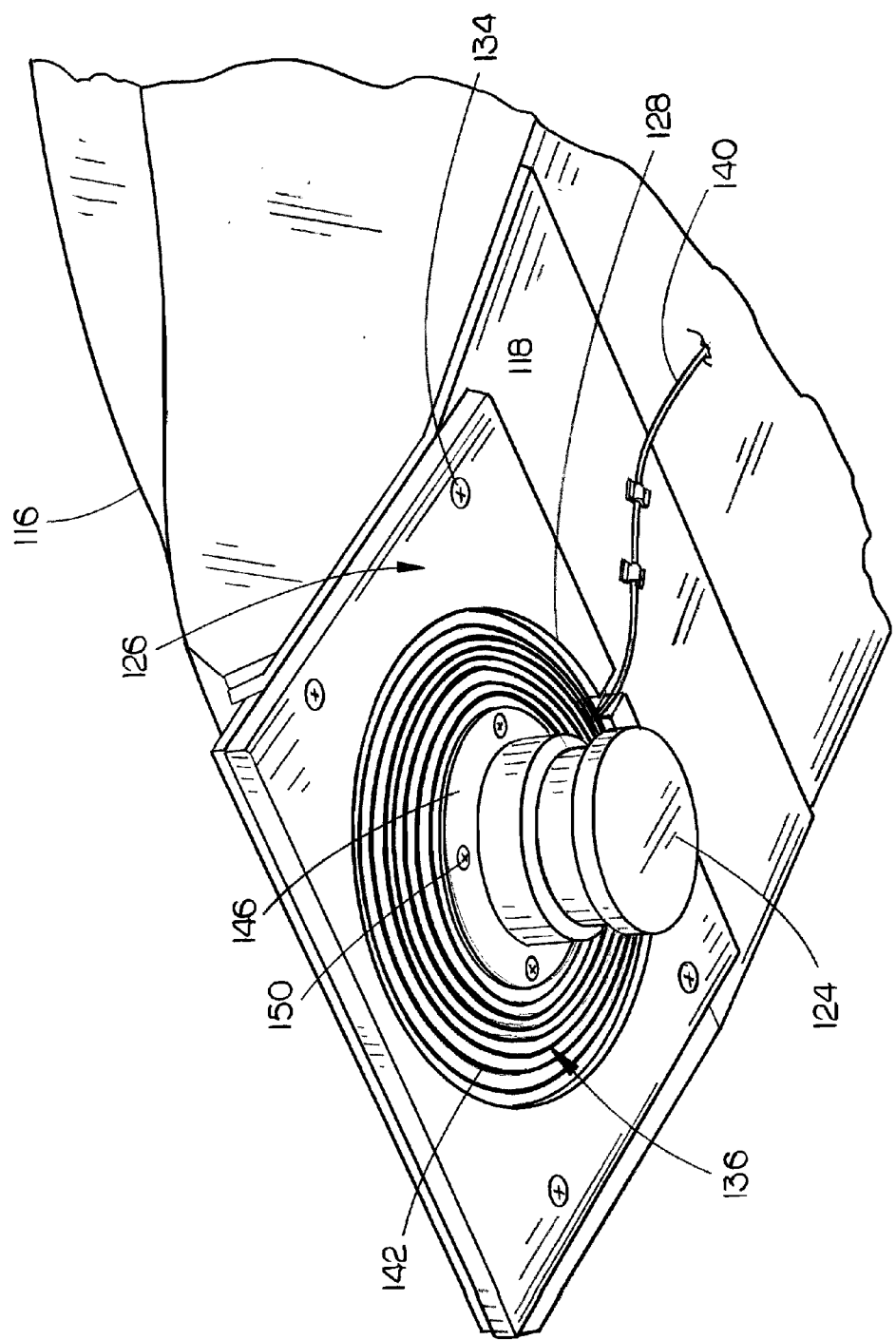
FIG. 8 is a perspective view of the electrical contacts which surround the kingpin of the trailer.
Figure 9:
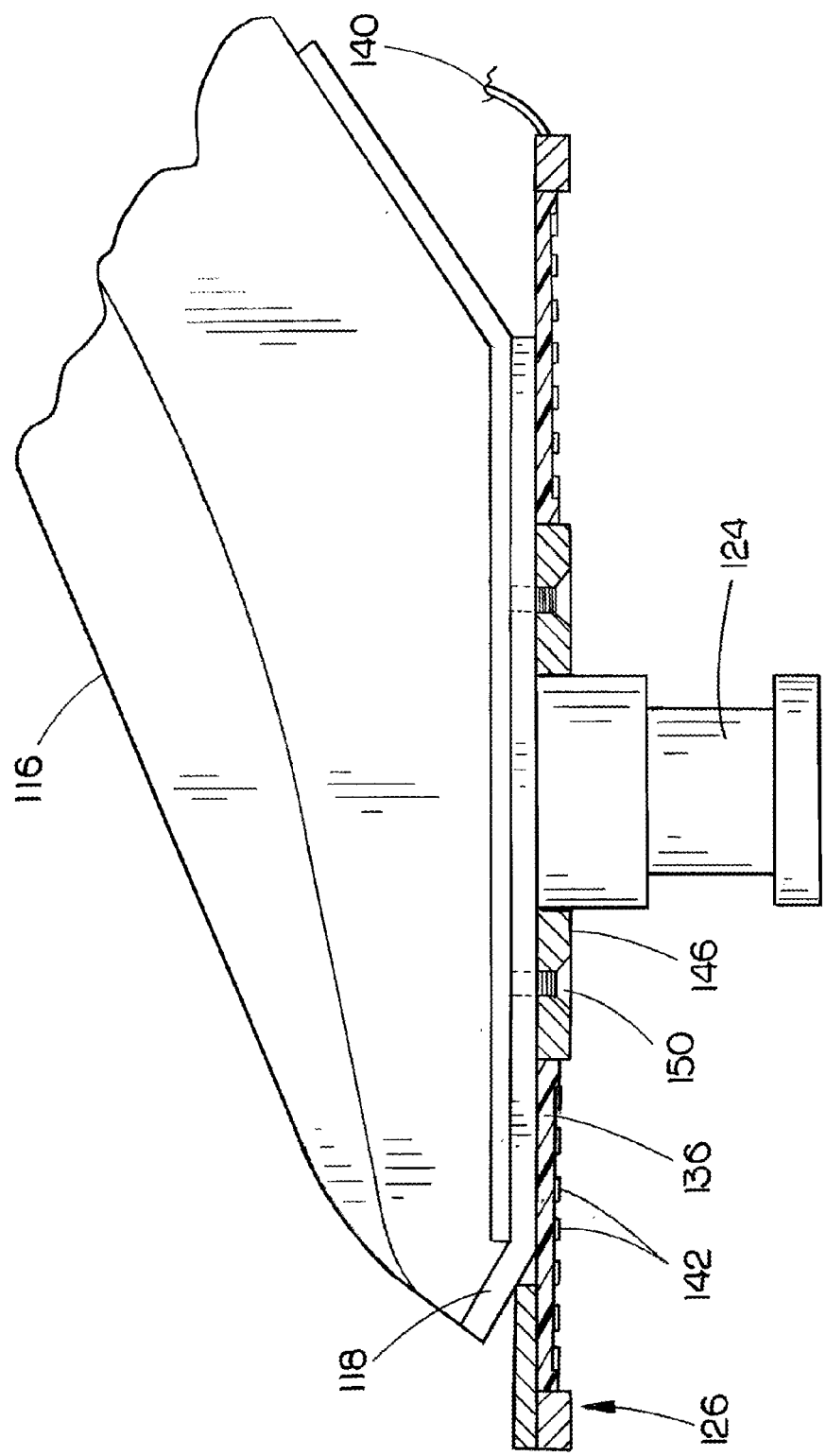
FIG. 9 is a partial side sectional view illustrating the electrical contact structure which is secured to the forward end of the trailer.

The numeral 126 refers to an electrical contact support plate which has a central opening 128 formed therein. A channel 130 extends from opening 128 as seen in FIG. 7. Plate 126 has four screw openings 132 formed therein. Plate 126 is positioned at the lower side of plate 118 and is secured thereto by screws 134 extending through screw openings 132 in plate 126 and into screw openings 120 in plate 118. Plate 126 is comprised of an electrical insulative material.

A flat ring-shaped electrical contactor 136 having a central opening 138 is positioned in the opening 128 of plate 126. Contactor 136 is secured to plate 126 by press-fitting or by an adhesive. Lead 140 extends from the contactor 136 through channel 130 to the electrical system of the trailer. Contactor 136 includes a plurality of electrical contact wires 142 which are mounted on the underside of an electrical insulator 144 to insulate the wires 142 from the fifth wheel structure. Contactor 136 is held in place by a ring 146 which is constructed of electrical insulative material. Ring 146 has a plurality of screw openings 148 formed therein which receive screws 150 extending upwardly therethrough for reception by the screw openings 152 in plate 118. As seen, the contact wires 142 protrude downwardly from the lower side of the contactor 136. Ring 146 is secured to contactor 136 by press-fitting or by an adhesive.

When the trailer is disconnected from the fifth wheel structure 10 of the vehicle, the electrical system of the trailer will be without power. When the trailer is disconnected from the vehicle, the handle 112 will normally be in its extended position so that cartridge 52 will be in its lower position, as seen in FIG. 5, so that the upper ends of the contactor 88 will be positioned below the top wall 32 of the inverted channel member 28.

Figure 10:
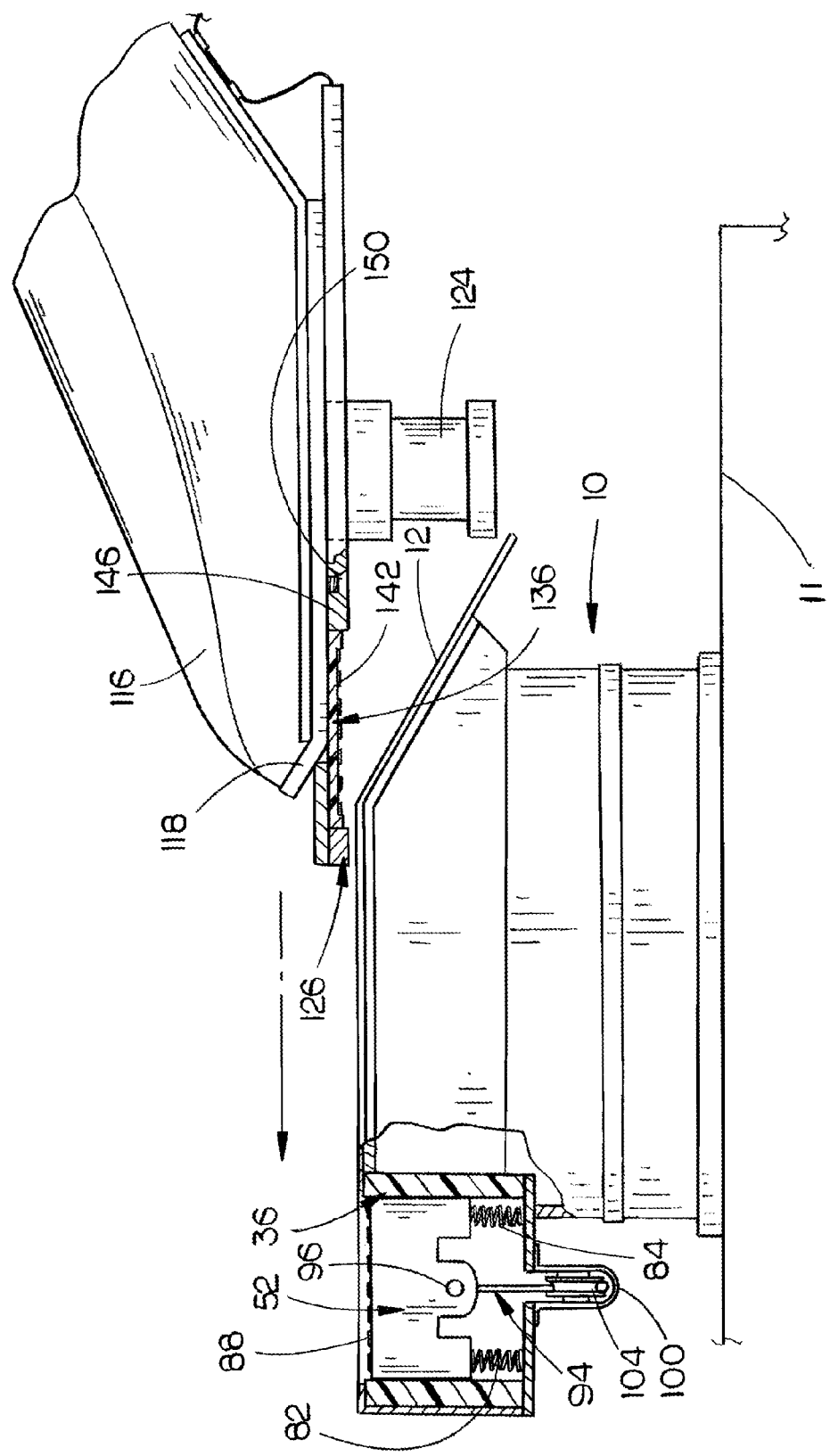
FIG. 10 is a partial side sectional view illustrating the kingpin structure of the trailer being moved into position with respect to the vehicle fifth wheel hitch.

As the trailer is being connected to the vehicle fifth wheel structure 10, as seen in FIG. 10, the wires 142 will not be initially in engagement with any portion of the fifth wheel structure 10 (FIG. 10).

Figure 11:
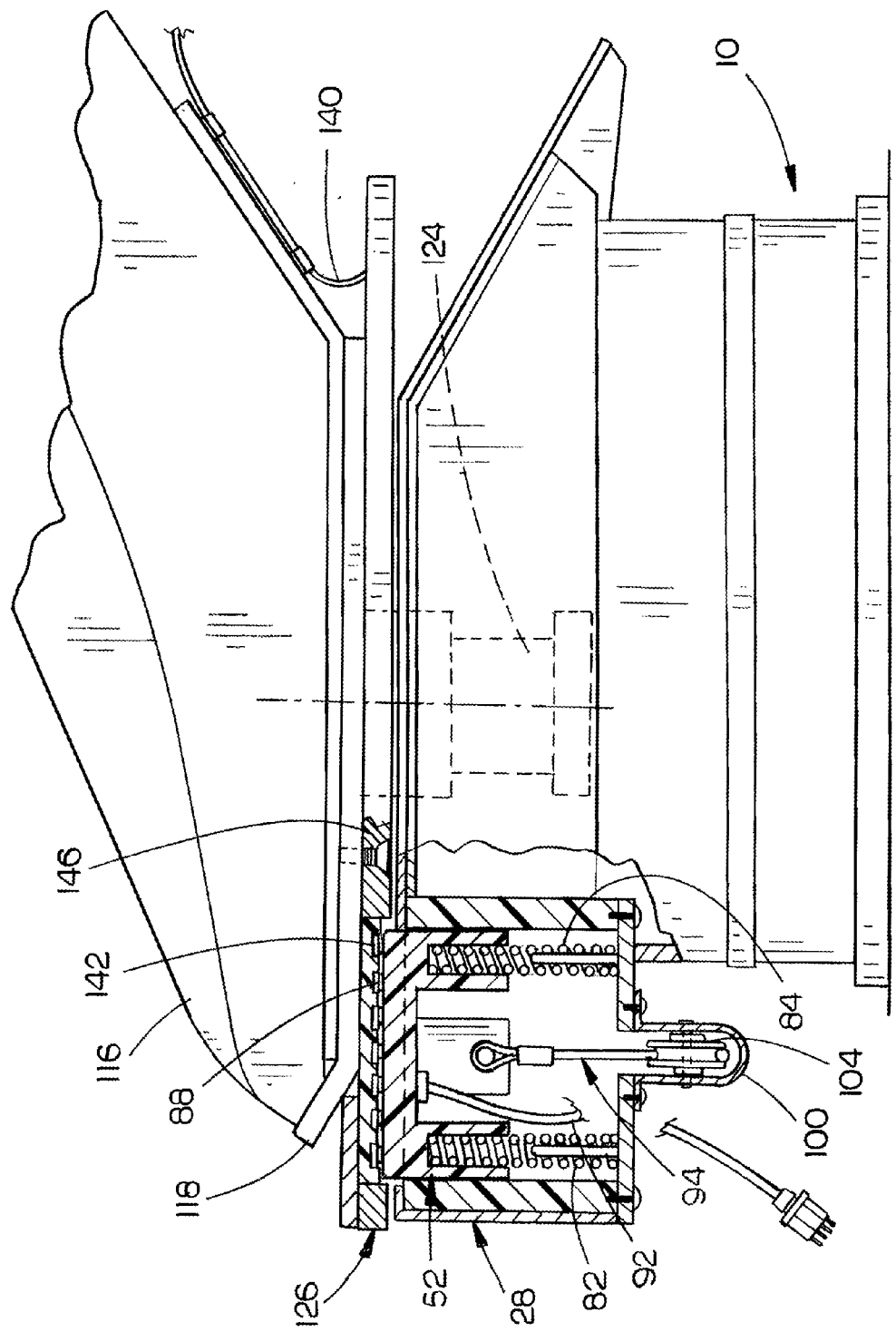
FIG. 11 is a view similar to FIG. 10 except that the kingpin structure of the trailer has been moved into its locked position with respect to the fifth wheel structure of the vehicle.

When the kingpin 124 has been positioned in the forward end of opening 18 and locked therein by the locking structure 20, the electrical wires 142 will not be in engagement with the contacts 88. The handle 112 is then slidably moved inwardly to release the tension in cable 94 so that springs 82 and 84 will yieldably urge cartridge 52 to its upper position of FIG. 11 so that the contacts 88 will be in engagement with the wires 142 thereby causing electrical power from the vehicle electrical system to be supplied to the electrical system of the trailer. The contacts 88 remain in electrical contact with the wires 142 even if the trailer pivotally moves laterally, upwardly or downwardly with respect to the fifth wheel structure 10.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A trailer and a vehicle in combination, comprising:

the trailer having an electrical system;

a generally horizontally disposed slider plate having a forward end, a rearward end, an upper surface and a lower surface, said slider plate mounted on said trailer at a forward end of said trailer, a ring-shaped electrical contactor positioned on said lower surface of said slider plate, said electrical contactor being electrically connected to the electrical system of said trailer, and a kingpin extending downwardly from said slider plate and said electrical contactor;

the vehicle having an electrical system, having a fifth wheel hitch mounted at a rearward end of said vehicle, said fifth wheel hitch including a slider plate having a forward end, a rearward end, an upper surface and a lower surface, said slider plate of said fifth wheel hitch having a kingpin receiving opening formed therein with forward and rearward ends, said fifth wheel hitch further including a kingpin locking structure positioned below said forward end of said kingpin receiving opening and configured to lock said kingpin in said kingpin receiving opening, an electrical contact cartridge positioned at said forward end of said slider plate of said fifth wheel hitch, said electrical contact cartridge having an upper end having and a plurality of spaced-apart electrical contacts which have upper ends positioned at said upper end of said electrical contact cartridge, said electrical contacts of said electrical contact cartridge being electrically connected to said electrical system of said vehicle; and wherein said electrical contactor of said trailer is capable of being electrically connected to said electrical contacts of said electrical contact cartridge when said kingpin of said trailer is locked into said kingpin receiving opening of said fifth wheel hitch whereby said electrical system of said trailer is electrically connected to said electrical system of said vehicle.

2. The combination of claim 1, wherein said electrical contact cartridge is vertically movably mounted in said fifth wheel hitch so as to be movable between upper and lower positions.

3. The combination of claim 2, wherein a spring means is operably engaged with said electrical contact cartridge for yieldably urging said electrical contact cartridge to said upper position.

4. The combination of claim 2, wherein a structure is connected to said electrical contact cartridge for selectively moving said electrical contact cartridge to said lower position.

* * * * *